United States Patent [19]
Messerly et al.

[11] Patent Number: 6,161,084
[45] Date of Patent: Dec. 12, 2000

[54] INFORMATION RETRIEVAL UTILIZING SEMANTIC REPRESENTATION OF TEXT BY IDENTIFYING HYPERNYMS AND INDEXING MULTIPLE TOKENIZED SEMANTIC STRUCTURES TO A SAME PASSAGE OF TEXT

[75] Inventors: John J. Messerly, Bainbridge Island; George E. Heidorn, Bellevue; Stephen D. Richardson; William B. Dolan, both of Redmond; Karen Jensen, Bellevue, all of Wash.

[73] Assignee: Microsoft Corporation, Redmond, Wash.

[21] Appl. No.: 09/366,499

[22] Filed: Aug. 3, 1999

Related U.S. Application Data

[62] Division of application No. 08/886,814, Mar. 7, 1997, Pat. No. 6,076,051.

[51] Int. Cl.⁷ .............................. G06F 17/27; G06F 17/30
[52] U.S. Cl. ................................... 704/9; 704/10; 707/2; 707/5
[58] Field of Search .......................... 704/9, 10, 1; 707/2, 707/3, 4, 5, 10, 100, 101, 102, 104, 530, 531, 532, 533

[56] References Cited

U.S. PATENT DOCUMENTS

| | | | |
|---|---|---|---|
| 4,839,853 | 6/1989 | Deerwester et al. | 707/5 |
| 5,146,406 | 9/1992 | Jensen | 704/9 |
| 5,278,980 | 1/1994 | Pedersen et al. | 707/4 |
| 5,325,298 | 6/1994 | Gallant | 704/9 |
| 5,386,556 | 1/1995 | Hedin et al. | 707/4 |
| 5,454,106 | 9/1995 | Burns et al. | 707/4 |

(List continued on next page.)

FOREIGN PATENT DOCUMENTS

| | | |
|---|---|---|
| 0 304 191 A2 | 2/1989 | European Pat. Off. . |
| 0 386 825 A1 | 9/1990 | European Pat. Off. . |
| 0 687 987 A1 | 12/1995 | European Pat. Off. . |

OTHER PUBLICATIONS

Gerard Salton, "Automatic Information Organization and Retrieval," McGraw Hill Book Company, pp. 168–178 (1968).

Fagan, Joel L., PhD., "Experiments in automatic phrase indexing for document retrieval: A comparision of syntactic and non–syntatic methods," Cornell University, *UMI Dissertation Information Service*, pp. 1–261 (1987).

James Allen, "Natural Language Understanding," The Benjamin/Cummings Publishing Company, Inc., Chapter 8, pp. 227–238 (1995).

Van Zuijlen, Job M., "Probabilistic Methods in Dependency Grammer Parsing," International Parsing Workshop, 10375:142–151 (1989).

*Primary Examiner*—Joseph Thomas

[57] ABSTRACT

The present invention is directed to performing information retrieval utilizing semantic representation of text. In a preferred embodiment, a tokenizer generates from an input string information retrieval tokens that characterize the semantic relationship expressed in the input string. The tokenizer first creates from the input string a primary logical form characterizing a semantic relationship between selected words in the input string. The tokenizer then identifies hypernyms that each have an "is a" relationship with one of the selected words in the input string. The tokenizer then constructs from the primary logical form one or more alternative logical forms. The tokenizer constructs each alternative logical form by, for each of one or more of the selected words in the input string, replacing the selected word in the primary logical form with an identified hypernym of the selected word. Finally, the tokenizer generates tokens representing both the primary logical form and the alternative logical forms. The tokenizer is preferably used to generate tokens for both constructing an index representing target documents and processing a query against that index.

18 Claims, 18 Drawing Sheets

U.S. PATENT DOCUMENTS

| | | | |
|---|---|---|---|
| 5,592,661 | 1/1997 | Eisenberg et al. | 707/104 |
| 5,619,709 | 4/1997 | Caid et al. | 707/532 |
| 5,630,121 | 5/1997 | Braden-Harder et al. | 707/102 |
| 5,675,745 | 10/1997 | Oku et al. | 705/7 |
| 5,675,819 | 10/1997 | Schuetze | 704/10 |
| 5,794,050 | 8/1998 | Dahlgren et al. | 395/708 |
| 5,794,178 | 8/1998 | Caid et al. | 704/9 |
| 5,799,308 | 8/1998 | Dixon | 707/100 |
| 5,873,056 | 2/1999 | Liddy et al. | 704/9 |
| 5,893,104 | 4/1999 | Srinivasan et al. | 707/102 |
| 5,895,464 | 4/1999 | Bhandari et al. | 707/3 |
| 5,933,822 | 8/1999 | Braden-Harder et al. | 707/5 |
| 5,963,940 | 10/1999 | Liddy et al. | 707/5 |
| 5,966,686 | 10/1999 | Heidorn et al. | 704/9 |
| 5,970,490 | 10/1999 | Morgenstern | 707/10 |
| 5,991,713 | 11/1999 | Unger et al. | 704/9 |
| 5,995,922 | 11/1999 | Penteroudakis et al. | 704/9 |
| 6,038,561 | 3/2000 | Snyder et al. | 707/6 |
| 6,070,134 | 5/2000 | Richardson et al. | 704/9 |
| 6,076,051 | 6/2000 | Messerly et al. | 704/9 |

| verb | deep object | deep subject | | |
|---|---|---|---|---|
| | | man | person | |
| kiss | pig | (man, kiss, pig) | (person, kiss, pig) | } 1231 |
| | swine | (man, kiss, swine) | (person, kiss, swine) | } 1232 } 1230 |
| | animal | (man, kiss, animal) | (person, kiss, animal) | } 1233 |
| touch | pig | (man, touch, pig) | (person, touch, pig) | } 1241 |
| | swine | (man, touch, swine) | (person, touch, swine) | } 1242 } 1240 |
| | animal | (man, touch, animal) | (person, touch, animal) | } 1243 |
| | | 1210 | 1220 | |

1200 ⟋ ((man OR person), (kiss OR touch), (pig OR swine OR animal))

*Fig. 12*

| token | document number | word number |
|---|---|---|
| ⋮ | ⋮ | |
| animal# | 5 | 152 |
| ⋮ | ⋮ | |
| kiss^ | 5 | 151 |
| ⋮ | ⋮ | |
| man_ | 5 | 150 |
| | | |
| person_ | 5 | 150 |
| | | |
| pig# | 5 | 152 |
| | | |
| swine# | 5 | 152 |
| | | |
| touch^ | 5 | 151 |
| | | |

INFORMATION RETRIEVAL UTILIZING SEMANTIC REPRESENTATION OF TEXT BY IDENTIFYING HYPERNYMS AND INDEXING MULTIPLE TOKENIZED SEMANTIC STRUCTURES TO A SAME PASSAGE OF TEXT

CROSS-REFERENCE TO RELATED APPLICATION

This application is a divisional of U.S. patent application No. 08/886,814, filed Mar. 7, 1997, now U.S. Pat. No. 6,076,051.

TECHNICAL FIELD

The present invention relates to the field of information retrieval, and, more specifically, to the field of information retrieval tokenization.

BACKGROUND OF THE INVENTION

Information retrieval refers to the process of identifying occurrences in a target document of words in a query or query document. Information retrieval can be gainfully applied in several situations, including processing explicit user search queries, identifying documents relating to a particular document, judging the similarities of two documents, extracting the features of a document and summarizing a document.

Information retrieval typically involves a two-stage process: (1) In an indexing stage, a document is initially indexed by (a) converting each word in the document into a series of characters intelligible to and differentiable by an information retrieval engine, called a "token" (known as "tokenizing" the document) and (b) creating an index mapping from each token to the location in the document where the token occurs. (2) In a query phase, a query (or query document) is similarly tokenized and compared to the index to identify locations in the document at which tokens in the tokenized query occur.

FIG. 1 is an overview data flow diagram depicting the information retrieval process. In the indexing stage, a target document 111 is submitted to a tokenizer 112. The target document is comprised of a number of strings, such as sentences, each occurring at a particular location in the target document. The strings in the target document and their word locations are passed to a tokenizer 120, which converts the words in each string into a series of tokens that are intelligible to and distinguishable by an information retrieval engine 130. An index construction portion 131 of the information retrieval engine 130 adds the tokens and their locations to an index 140. The index maps each unique token to the locations at which it occurs in the target document. This process may be repeated to add a number of different target documents to the index, if desired. If the index 140 thus represents the text in a number of target documents, the location information preferably includes an indication of, for each location, the document to which the location corresponds.

In the query phase, a textual query 112 is submitted to the tokenizer 120. The query may be a single string, or sentence, or may be an entire document comprised of a number of strings. The tokenizer 120 converts the words in the text of the query 112 into tokens in the same manner that it converted the words in the target document into tokens. The tokenizer 120 passes these tokens to an index retrieval portion 132 of the information retrieval engine 130. The index retrieval portion of the information retrieval engine searches the index 140 for occurrences of the tokens in the target document. For each of the tokens, the index retrieval portion of the information retrieval engine identifies the locations at which the token occurs in the target document. This list of locations is returned as the query result 113.

Conventional tokenizers typically involve superficial transformations of the input text, such as changing each upper-case character to lower-case, identifying the individual words in the input text, and removing suffixes from the words. For example, a conventional tokenizer might convert the input text string The father is holding the baby.

into the following tokens:

the
father
is
hold
the
baby

This approach to tokenization tends to make searches based on it overinclusive of occurrences in which senses of words are different than the intended sense in the query text. For example, the sample input text string uses the verb "hold" in the sense that means "to support or grasp." However, the token "hold" could match uses of the word "hold" that mean "the cargo area of a ship." This approach to tokenization also tends to be overinclusive of occurrences in which the words relate to each other differently than the words in the query text. For example, the sample input text string above, in which "father" is the subject of the word "held" and "baby" is the object, might match the sentence "The father and the baby held the toy," in which "baby" is a subject, not an object. This approach is further underinclusive of occurrences that use a different, but semantically related word in place of a word of the query text. For example, the input text string above would not match the text string "The parent is holding the baby." Given these disadvantages of conventional tokenization, a tokenizer that enacts semantic relationships implicit in the tokenized text would have significant utility.

SUMMARY OF THE INVENTION

The invention is directed to performing information retrieval using an improved tokenizer that parses input text to identify logical forms, then expands the logical forms using hypernyms. The invention, when used in conjunction with conventional information retrieval index construction and querying, reduces the number of identified occurrences for which different senses were intended and in which words bear different relationships to each other, and increases the number of identified occurrences in which different but semantically related terms are used.

The invention overcomes the problems associated with conventional tokenization by parsing both indexed and query text to perform lexical, syntactic, and semantic analysis of this input text. This parsing process produces one or more logical forms, which identify words that perform primary roles in the query text and their intended senses, and that further identify the relationship between those words. The parser preferably produces logical forms that relate the deep subject, verb, and deep object of the input text. For example, for the input text "The father is holding the baby," the parser might produce the following logical form:

| deep subject | verb | deep object |
|---|---|---|
| father | hold | baby |

The parser further ascribes to these words the particular senses in which they are used in the input text.

Using a digital dictionary or thesaurus (also known as a "linguistic knowledge base") that identifies, for a particular sense of a word, senses of other words that are generic terms for the sense of the word ("hypernyms"), the invention changes the words within the logical forms produced by the parser to their hypernyms to create additional logical forms having an overall meaning that is hypernymous to the meaning of these original logical forms. For example, based on indications from the dictionary that a sense of "parent" is a hypernym of the ascribed sense of "father," a sense of "touch" is a hypernym of the ascribed sense of "hold," and a sense of "child" and sense of "person" are hypernyms of the ascribed sense of "baby," the invention might create additional logical forms as follows:

| deep subject | verb | deep object |
|---|---|---|
| parent | hold | baby |
| father | touch | baby |
| parent | touch | baby |
| father | hold | child |
| parent | hold | child |
| father | touch | child |
| parent | touch | child |
| father | hold | person |
| parent | hold | person |
| father | touch | person |
| parent | touch | person |

The invention then transforms all of the generated logical forms into tokens intelligible by the information retrieval system that compares the tokenized query to the index, and submits them to the information retrieval system.

BRIEF DESCRIPTION OF THE DRAWINGS

FIG. 12 is a chart diagram showing the derivative logical forms created by permuting the expanded primary logical form.

FIG. 13 is an index diagram showing sample contents of the index.

DETAILED DESCRIPTION OF THE INVENTION

The present invention is directed to performing information retrieval utilizing semantic representation of text. When used in conjunction with conventional information retrieval index construction and querying, the invention reduces the number of identified occurrences for which different senses were intended and in which words bear different relationships to each other, and increases the number of identified occurrences in which different but semantically related terms are used.

Figure 1:
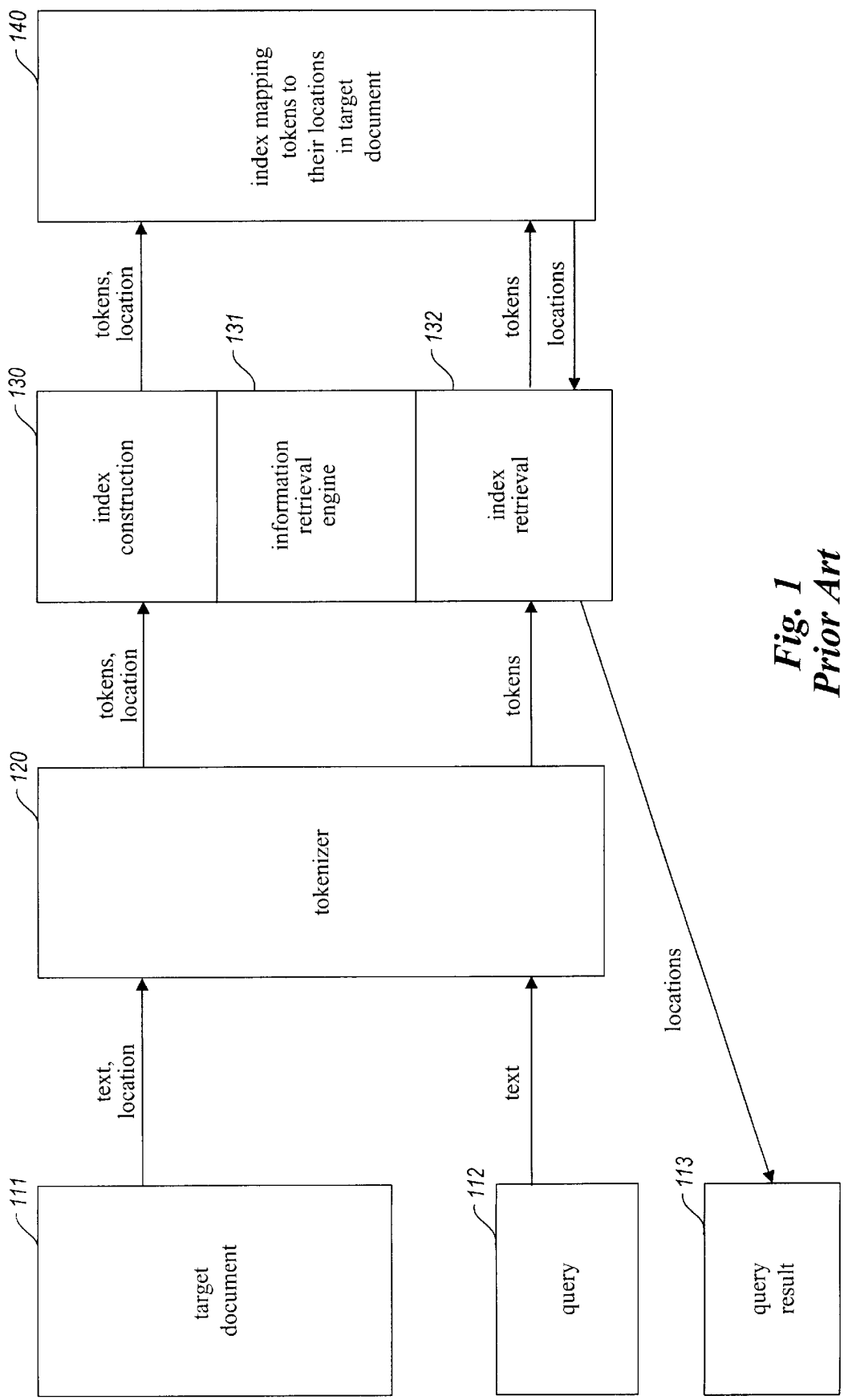
FIG. 1 is an overview data flow diagram depicting the information retrieval process.

In a preferred embodiment, the conventional tokenizer shown in FIG. 1 is replaced with an improved information retrieval tokenization facility ("the facility") that parses input text to identify logical forms, then expands the logical forms using hypernyms. The invention overcomes the problems associated with conventional tokenization by parsing both indexed and query text to perform lexical, syntactic, and semantic analysis of this input text. This parsing process produces one or more logical forms, which identify words that perform primary roles in the query text and their intended senses, and that further identify the relationship between those words. The parser preferably produces logical forms that relate the deep subject, verb, and deep object of the input text. For example, for the input text "The father is holding the baby," the parser might produce logical form indicating the deep subject is "father," the verb is "hold," and the deep object is "baby." Because transforming input text into a logical form distills the input text to its fundamental meaning by eliminating modifiers and ignoring differences in tense and voice, transforming input text segments into the logical forms tends to unify the many different ways that may be used in a natural language to express the same idea. The parser further identifies the particular senses of these words in which they are used in the input text.

Using a digital dictionary or thesaurus (also known as a "linguistic knowledge base") that identifies, for a particular sense of a word, senses of other words that are generic terms for the sense of the word ("hypernyms"), the invention changes the words within the logical forms produced by the parser to their hypernyms to create additional logical forms having an overall meaning that is hypernymous to the meaning of these original logical forms. The invention then transforms all of the generated logical forms into tokens intelligible by the information retrieval system that compares the tokenized query to the index, and submits them to the information retrieval system.

Figure 2:
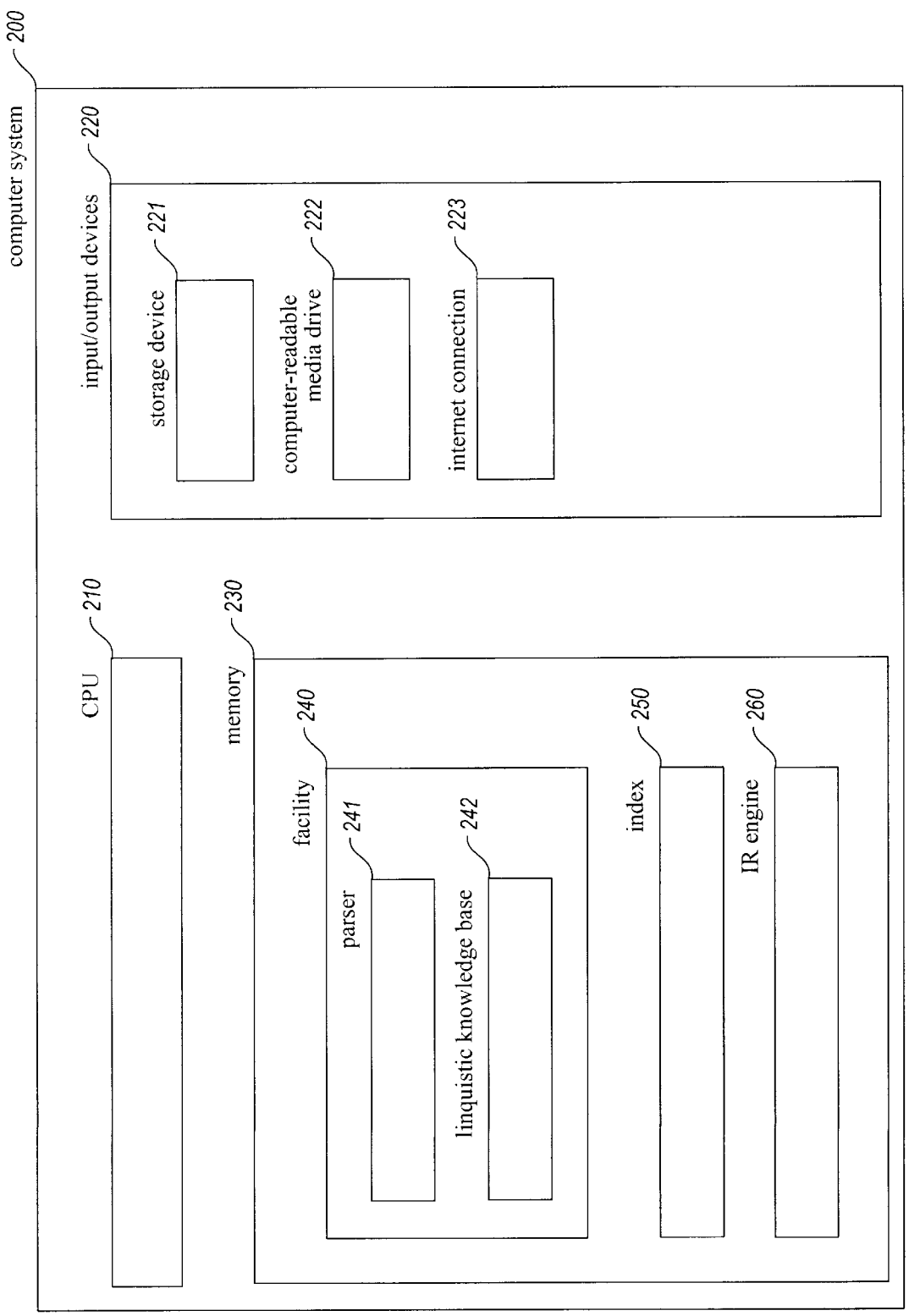
FIG. 2 is a high-level block diagram of the general-purpose computer system upon which the facility preferably operates.

FIG. 2 is a high-level block diagram of the general-purpose computer system upon which the facility preferably operates. The computer system 200 contains a central processing unit (CPU) 210, input/output devices 220, and a computer memory (memory) 230. Among the input/output devices is a storage device 221, such as a hard disk drive. The input/output devices also include a computer-readable media drive 222, which can be used to install software products, including the facility which are provided on a computer-readable medium, such as a CD-ROM. The input/output devices further include an Internet connection 223 enabling the computer system 200 to communicate with other computer systems via the Internet. The computer programs that preferably comprise the facility 240 reside in the memory 230 and execute on the CPU 210. The facility 240 includes a rule-based parser 241 for parsing input text segments to be tokenized in order to produce logical forms. The facility 240 further includes a linguistic knowledge base 242 used by the parser to ascribe sense numbers to words in the logical form. The facility further uses the linguistic knowledge base to identify hypernyms of the words in the generated logical forms. The memory 230 preferably also contains an index 250 for mapping from tokens generated from the target documents to locations in the target documents. The memory 230 also contains an information retrieval engine ("IR engine") 260 for storing tokens generated from the target documents in the index 250, and for identifying in the index tokens that match tokens generated from queries. While the facility is preferably implemented on a computer system configured as described above, those skilled in the art will recognize that it may also be implemented on computer systems having different configurations.

Figure 3:
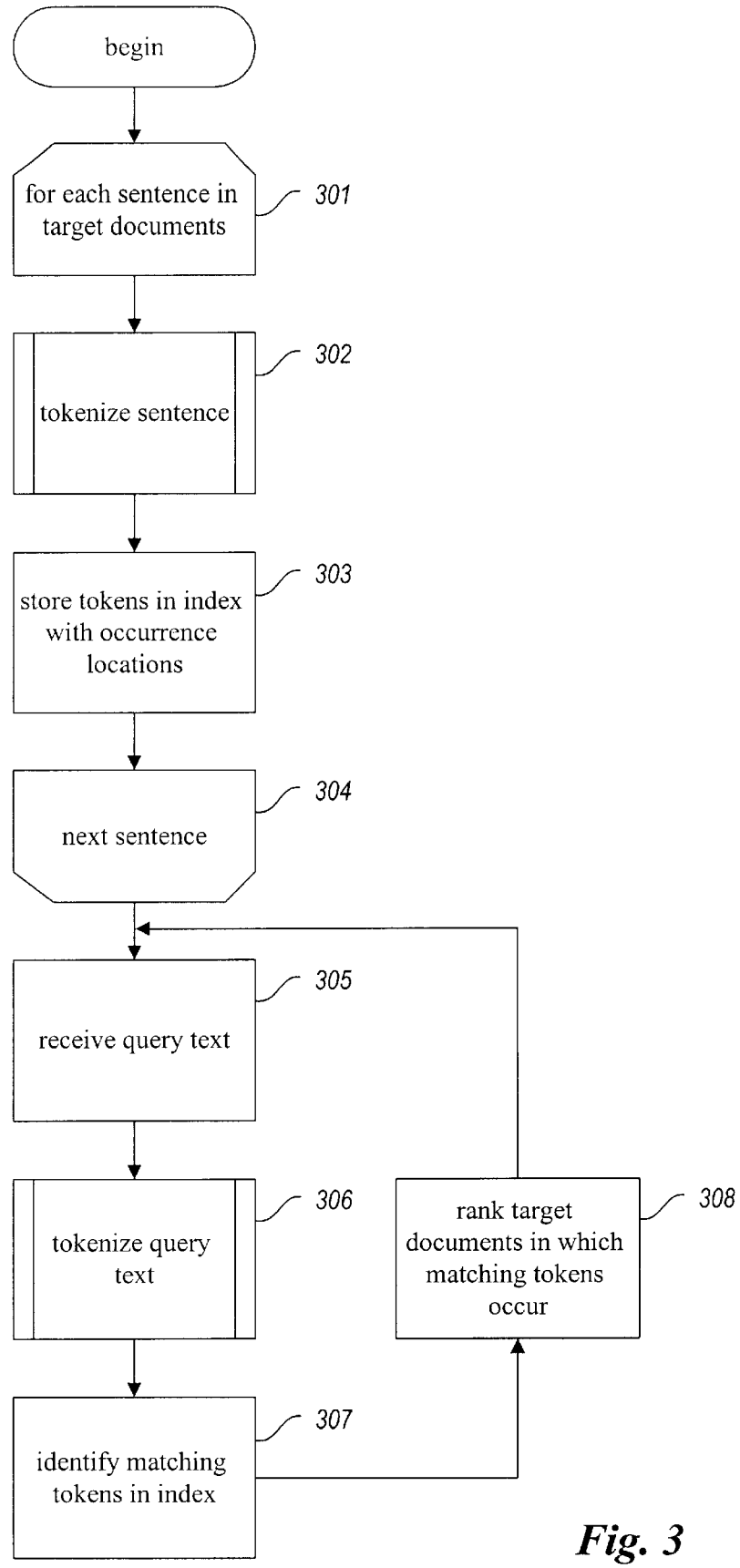
FIG. 3 is an overview flow diagram showing the steps preferably performed by the facility in order to construct and access an index semantically representing the target documents.

FIG. 3 is an overview flow diagram showing the steps preferably performed by the facility in order to construct and access an index semantically representing the target documents. Briefly, the facility first semantically indexes the target documents by converting each sentence or sentence fragment of the target document into a number of tokens representing an expanded logical form portraying the relationship between the important words in the sentence, including hypernyms having similar meanings. The facility stores these "semantic tokens" in the index, along with the location in the target documents where the sentence occurs. After all of the target documents have been indexed, the facility is able to process information retrieval queries against the index. For each such query received, the facility tokenizes the text of the query in the same way it tokenized sentences from the target documents—by converting the sentence into semantic tokens together representing an expanded logical form for the query text. The facility then compares these semantic tokens to the semantic tokens stored in the index to identify locations in the target documents for which these semantic tokens have been stored, and ranks the target documents containing these semantic tokens in the order of their relevance to the query. The facility may preferably update the index to include semantic tokens for new target documents at any time.

Referring to FIG. 3, in steps 301–304, the facility loops through each sentence in the target documents. In step 302, the facility invokes a routine to tokenize the sentence as shown in FIG. 4.

Figure 4:
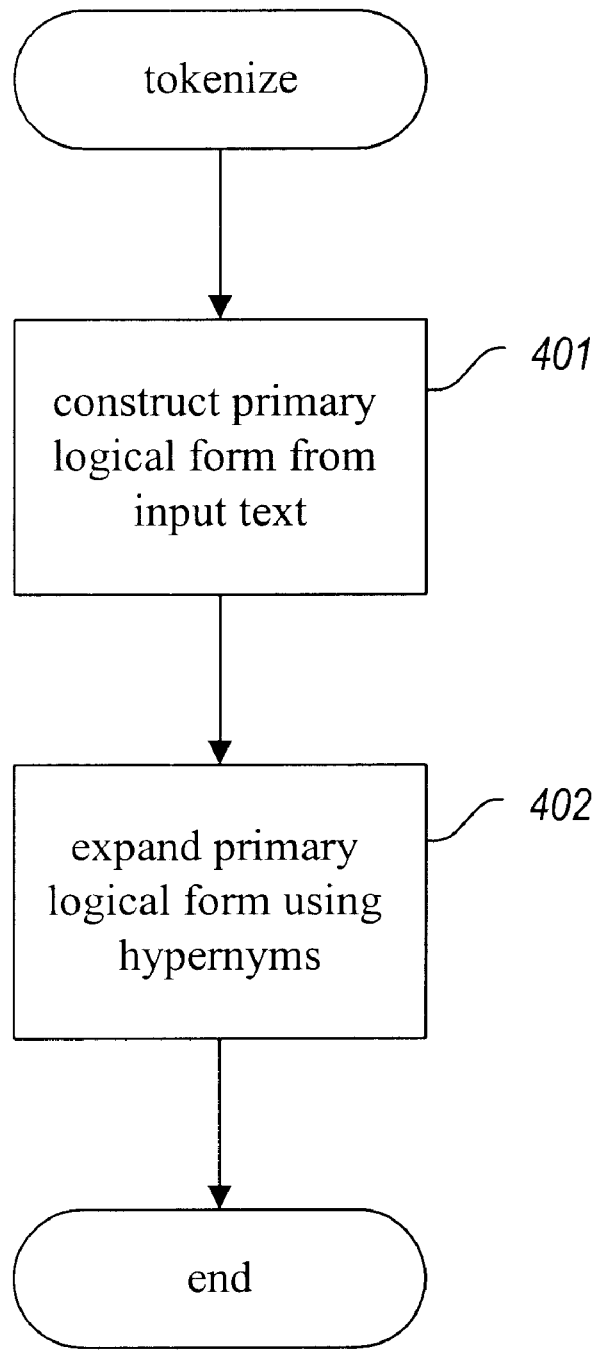
FIG. 4 is a flow diagram showing the tokenize routine used by the facility to generate tokens for an input sentence.

FIG. 4 is a flow diagram showing the tokenize routine used by the facility to generate tokens for an input sentence or other input text segment. In step 401, the facility constructs a primary logical form from the input text segment. As discussed above, a logical form represents the fundamental meaning of a sentence or sentence fragment. The logical forms are produced by applying the parser 241 (FIG. 2) to subject the input text segment to a syntactic and semantic parsing process. For a detailed discussion of the construction of logical forms representing an input text string, refer to U.S. patent application No. 08/674,610, which is hereby incorporated by reference.

Figure 5:
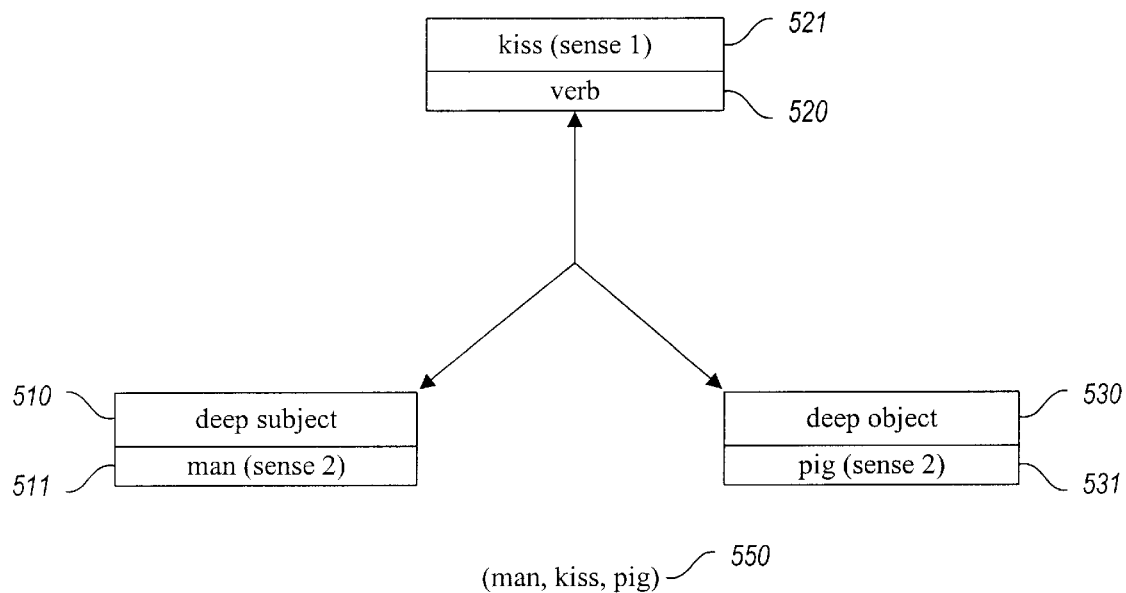
FIG. 5 is a logical form diagram showing a sample logical form.

The logical form used by the facility preferably isolates the principal verb of the sentence, the noun that is the real subject of the verb ("deep subject") and the noun that is the real object of the verb ("deep object"). FIG. 5 is a logical form diagram showing a sample primary logical form. The logical form has three elements: a deep subject element 510, a verb element 520, and a deep object element 530. It can be seen that the deep subject of the logical form is sense 2 of the word "man." The sense number indicates, for words having more than one sense, the particular sense ascribed to the word by the parser as defined by the linguistic knowledge base used by the parser. For example, the word "man" could have a first sense meaning to supply with people and a second sense meaning adult male person. The verb of the logical form is a first sense of the word "kiss." Finally, the deep object is a second sense of the word "pig." An abbreviated version of this logical form is an ordered triple 550 having as its first element the deep subject, as its second element the verb, and as its third element the deep object:

(man, kiss, pig)

Figure 6:
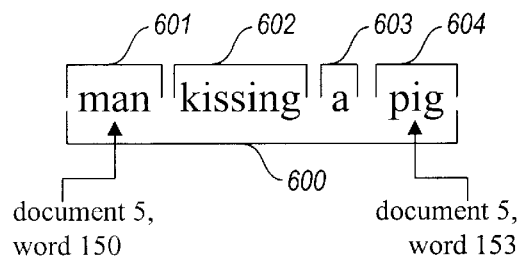
FIG. 6 is an input text diagram showing an input text fragment for which the facility would construct the logical form shown in FIG. 5.

The logical form shown in FIG. 5 characterizes a number of different sentences and sentence fragments. For example, FIG. 6 is an input text diagram showing an input text segment for which the facility would construct the logical form shown in FIG. 5. FIG. 6 shows the input text sentence fragment "man kissing a pig." It can be seen that this phrase occurs at word number 150 of document 5, occupying word positions 150, 151, 152, and 153. When the facility is tokenizing this input text fragment, it generates the logical form shown in FIG. 5. The facility would also generate the logical form shown in FIG. 5 for the following input text segments:

The pig was kissed by an unusual man.

The man will kiss the largest pig.

Many pigs have been kissed by that man.

As discussed above, because transforming input text into a logical form distills the input text to its fundamental meaning by eliminating modifiers and ignoring differences in tense and voice, transforming input text segments into the logical forms tends to unify the many different ways that may be used in a natural language to express the same idea.

Returning to FIG. 4, after the facility has constructed the primary logical form from the input text, such as the logical form shown in FIG. 5, the facility continues in step 402 to expand this primary logical form using hypernyms. After step 402, the tokenized routine returns.

As mentioned above, a hypernym is a genus term that has an "is a" relationship with a particular word. For instance, the word "vehicle" is a hypernym of the word "automobile." The facility preferably uses a linguistic knowledge base to identify hypernyms of the words in the primary logical form. Such a linguistic knowledge base typically contains semantic links identifying hypernyms of a word.

Figure 7A:
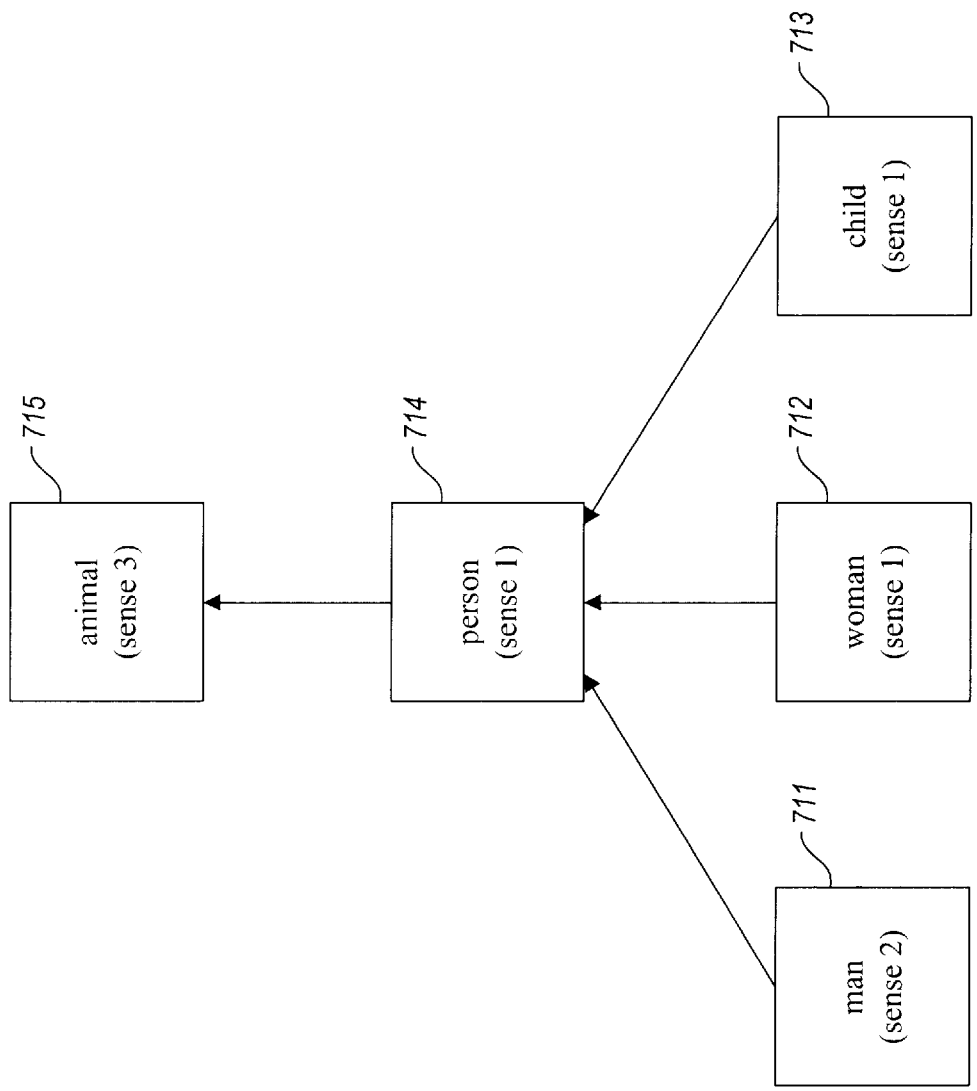
FIG. 7A is a linguistic knowledge base diagram showing sample hypernym relationships identified by a linguistic knowledge base.

FIG. 7A is a linguistic knowledge base diagram showing sample hypernym relationships identified by a linguistic knowledge base. It should be noted that FIG. 7A, like the linguistic knowledge base diagrams that follow, has been simplified to facilitate this discussion, and omits information commonly found in linguistic knowledge bases that is not directly relevant to the present discussion. Each ascending arrow in FIG. 7A connects a word to its hypernym. For example, there is an arrow connecting the word man (sense 2) 711 to the word person (sense 1) 714, indicating that person (sense 1) is a hypernym of man (sense 2). Conversely, man (sense 2) is said to be a "hyponym" of person (sense 1).

In identifying hypernyms with which to expand the primary logical form, the facility selects one or more hypernyms for each word of the primary logical form based upon the "coherency" of the hypernyms' hyponyms. By selecting hypernyms in this manner, the facility generalizes the meaning of the logical form beyond the meaning of the input text segment, but by a controlled amount. For a particular word of a primary logical form, the facility first selects the immediate hypernym of the word of the primary logical form. For example, with reference to FIG. 7A, starting with man (sense 2) 711 which occurs in the primary logical form, the facility selects its hypernym, person (sense 1) 714. The facility next bases its determination of whether to also select the hypernym of person (sense 1) 714, animal (sense 3) 715, on whether person (sense 1) 714 has a coherent hyponym set with respect to the starting word man (sense 2) 711. Person (sense 1) 714 has a coherent hyponym set with respect to man (sense 2) 711 if a large number of hyponyms of all senses of the word person other than the starting word (sense 2) 711 bear at least a threshold level of similarity to the starting word man (sense 2) 711.

Figure 7B:
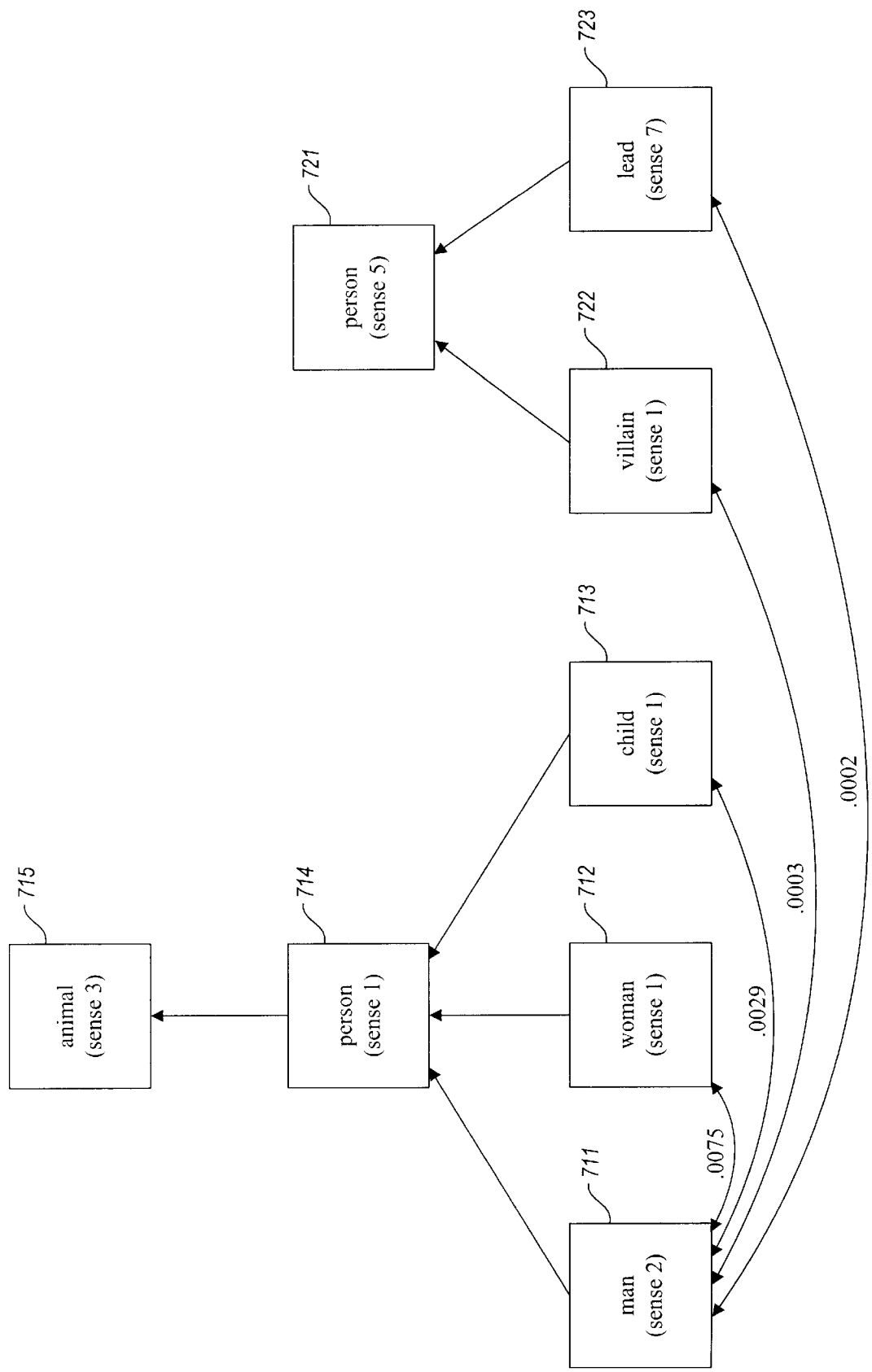
FIG. 7B is a linguistic knowledge base diagram showing the selection of hypernyms of the deep subject of the primary logical form, man (sense 2).

In order to determine the level of similarity between the hyponyms of the different senses of the hypernym, the facility preferably consults the linguistic knowledge base to obtain similarity weights indicating the degree of similarity between these word sentences. FIG. 7B is a linguistic knowledge base diagram showing similarity weights between man (sense 2) and other hyponyms of person (sense 1) and person (sense 5). The diagram shows that the similarity weight between man (sense 2) and woman (sense 1) is "0.0075"; between man (sense 2) and child (sense 1) is "0.0029"; between man (sense 2) and villain (sense 1) is "0.0003"; and between man (sense 2) and lead (sense 7) is "0.0002". These similarity weights are preferably calculated by the linguistic knowledge base based on a network of semantic relations maintained by the linguistic knowledge base between the word sense pairs. For a detailed discussion of calculating similarity weights between word sense pairs using a linguistic knowledge base, refer to U.S. patent application No. 08/904,223, entitled "DETERMINING SIMILARITY BETWEEN WORDS," which is hereby incorporated by reference.

In order to determine whether the set of hyponyms is coherent based on these similarity weights, the facility determines whether a threshold number of the similarity weights exceed a threshold similarity weight. While the preferred threshold percentage is 90%, the threshold percentage may preferably be adjusted in order to optimize the performance of the facility. The similarity weight threshold may also be configured to optimize the performance of the facility. The threshold similarity weight is preferably coordinated with the overall distribution of similarity weights provided by the linguistic knowledge base. Here, the use of a threshold of "0.0015" is shown. The facility therefore determines whether at least 90% of the similarity weights between the starting word and the other hyponyms of all of the senses of the hypernym are at or above the "0.0015" threshold similarity weight. It can be seen from FIG. 7B that this condition is not satisfied by the hyponyms of person with respect to man (sense 1): while the similarity weights between man (sense 1) and woman (sense 1) and between man (sense 1) and child (sense 1) are greater than "0.0015", the similarity weights between man (sense 1) and villain (sense 1) and between man (sense 1) and lead (sense 7) are less than "0.0015". The facility therefore does not select the further hypernym animal (sense 3) 715, or any hypernyms of animal (sense 3). As a result, only the hypernym person (sense 1) 714 is selected to expand the primary logical form.

Figure 8:
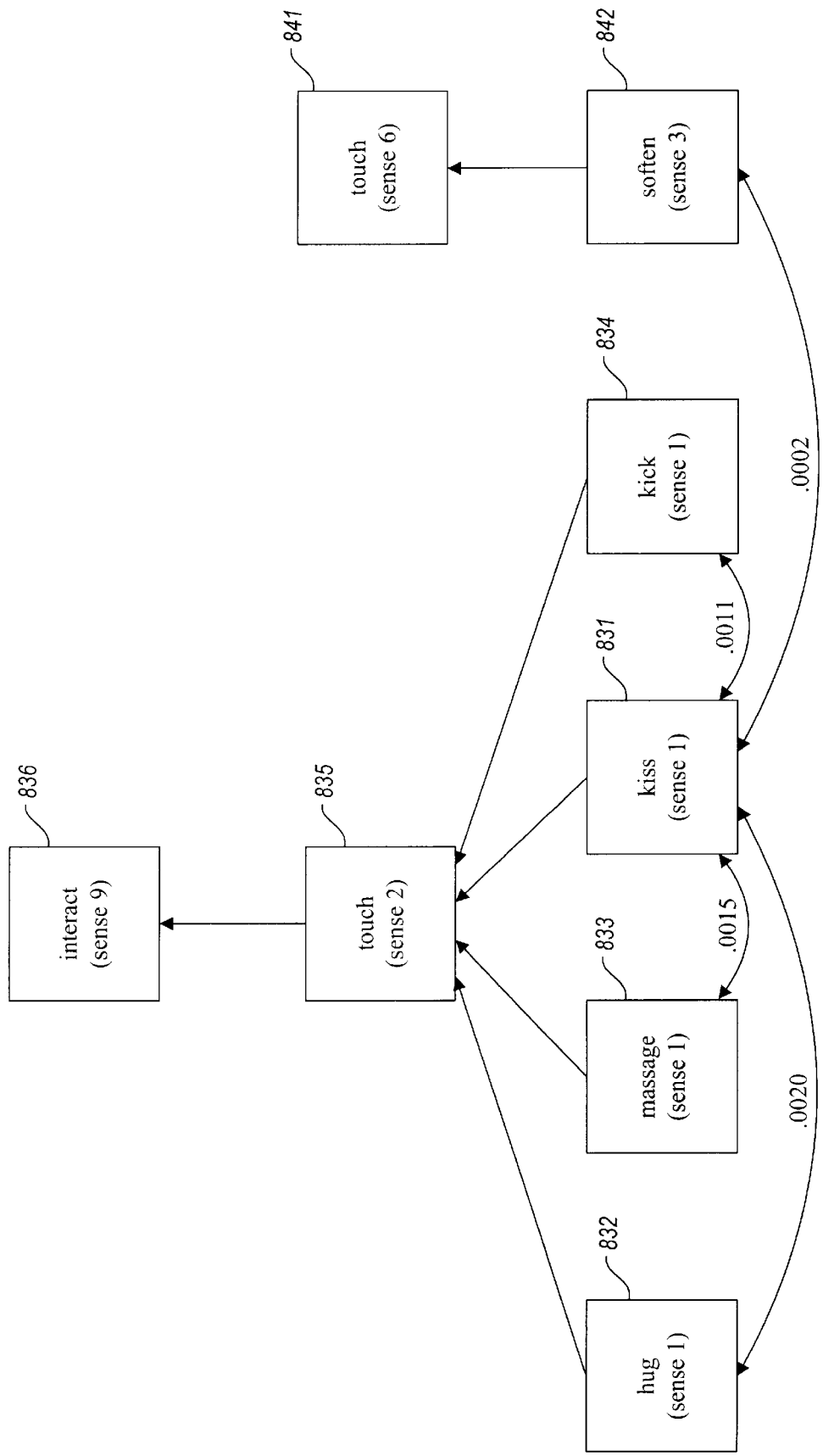
FIG. 8 is a linguistic knowledge base diagram showing the selection of hypernyms of the verb of the primary logical form, kiss (sense 1).

To expand a primary logical form, the facility also selects hypernyms of the verb and deep object of the primary logical form. FIG. 8 is a linguistic knowledge base diagram showing the selection of hypernyms of the verb of the primary logical form, kiss (sense 1). It can be seen from the diagram that touch (sense 2) is the hypernym of kiss (sense 1). The diagram also shows the similarity weights between kiss (sense 1) and the other hyponyms of all of the senses of touch. The facility first selects the immediate hypernym of the verb of the primary logical form kiss (sense 1), touch (sense 2). To determine whether to select the hypernym of touch (sense 2), interact (sense 9), the facility determines how many similarity weights between kiss (sense 1) and the other hyponyms of all of the senses of touch are at least as large as the threshold similarity weight. Because only two of these four similarity weights are at least as large as the "0.0015" threshold similarity weight, the facility does not select the hypernym of touch (sense 2), interact (sense 9).

Figure 9:
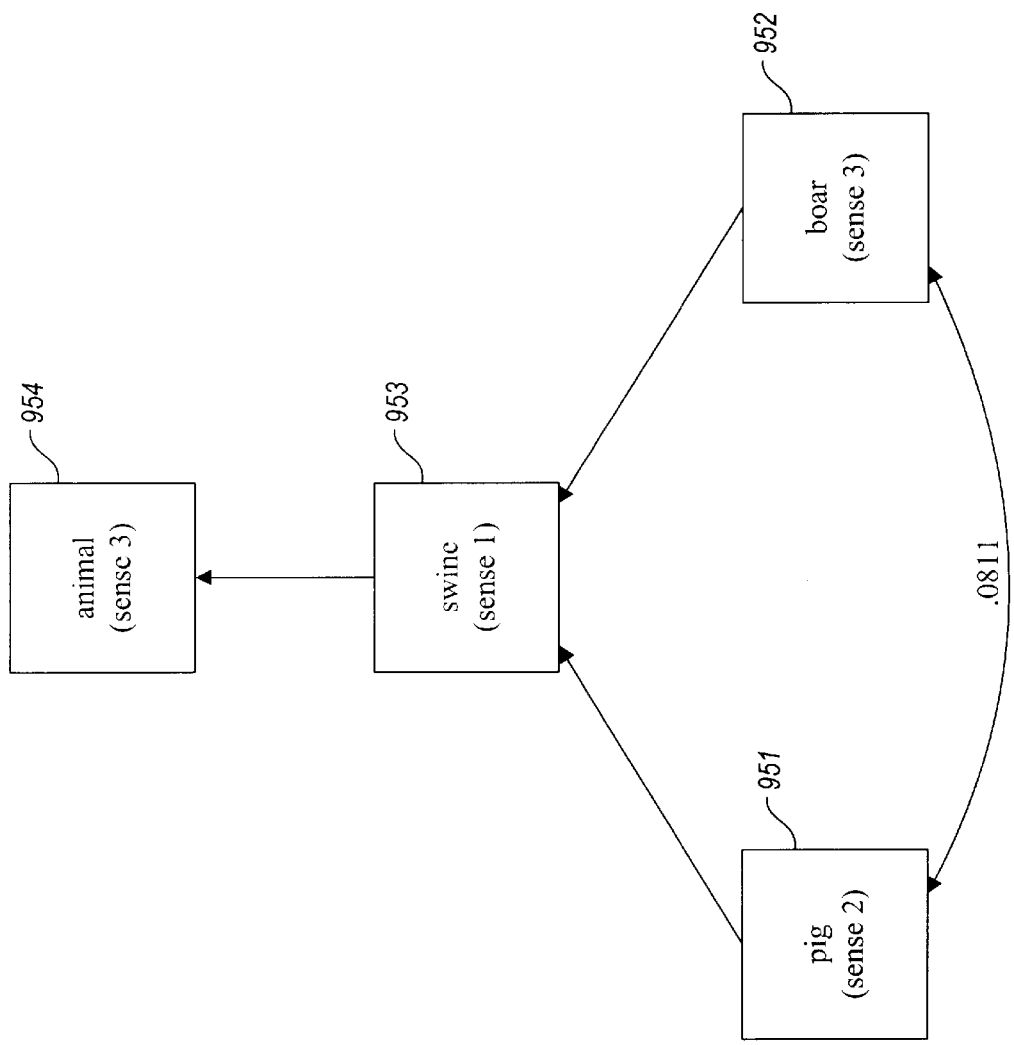
FIGS. 9 and 10 are linguistic knowledge base diagrams showing the selection of hypernyms of the deep object of the primary logical form, pig (sense 2).
Figure 10:
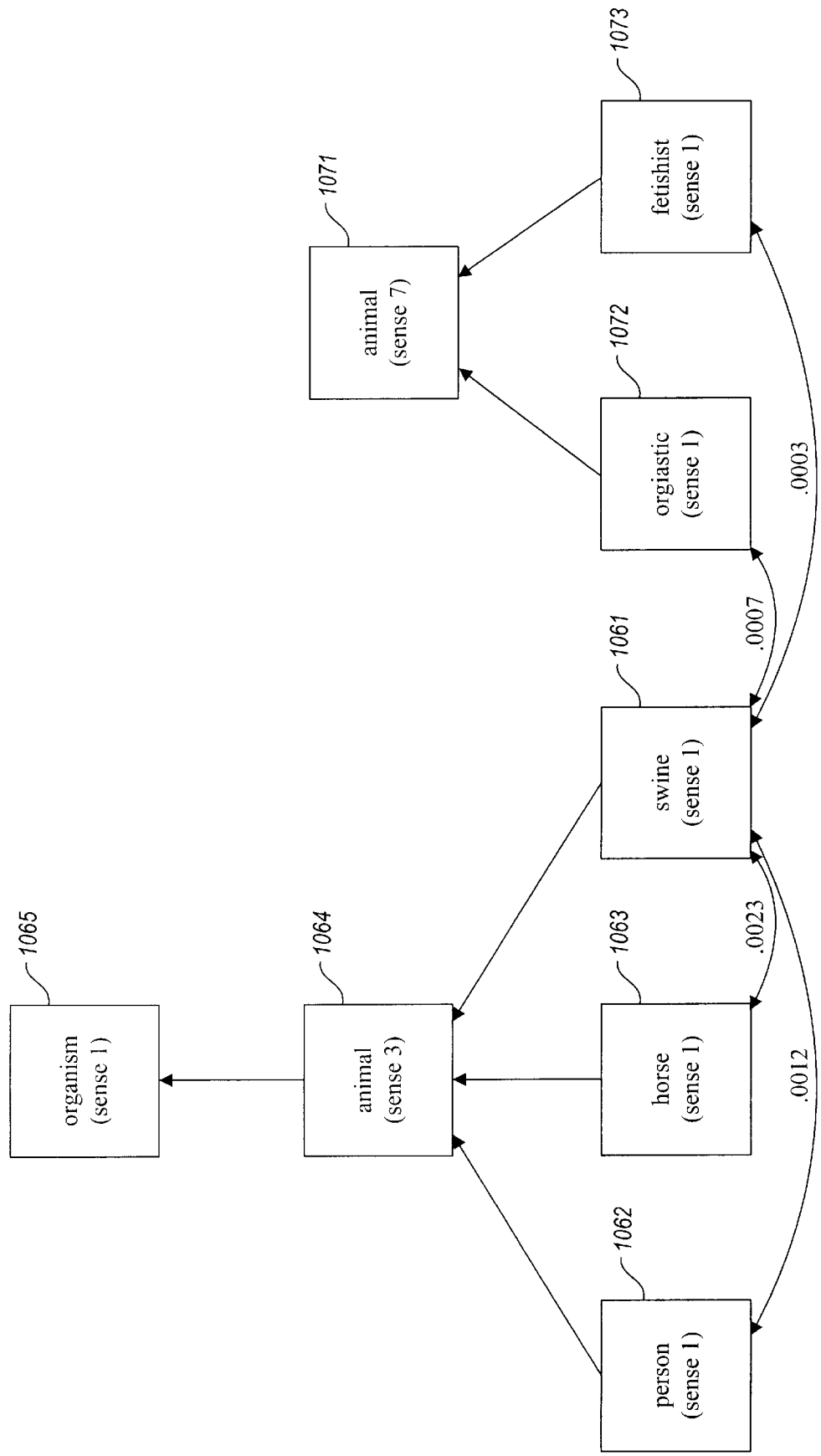

FIGS. 9 and 10 are linguistic knowledge base diagrams showing the selection of hypernyms of the deep object of the primary logical form and pig (sense 2). It can be seen from FIG. 9 that the facility selects the hypernym swine (sense 1) of pig (sense 2) to expand the primary logical form, as well as the hypernym animal (sense 3) of swine (sense 1), as more than 90% (in fact, 100%) of the hypernyms of the only sense of swine have similarly weights at or about the "0.0015" threshold similarity weight. It can be seen from FIG. 10 that the facility does not continue to select the hypernym organism (sense 1) of animal (sense 3), as fewer than 90% (actually 25%) of the hyponyms of senses of animal have similarity weights at or about the "0.0015" threshold similarity weight.

Figure 11:
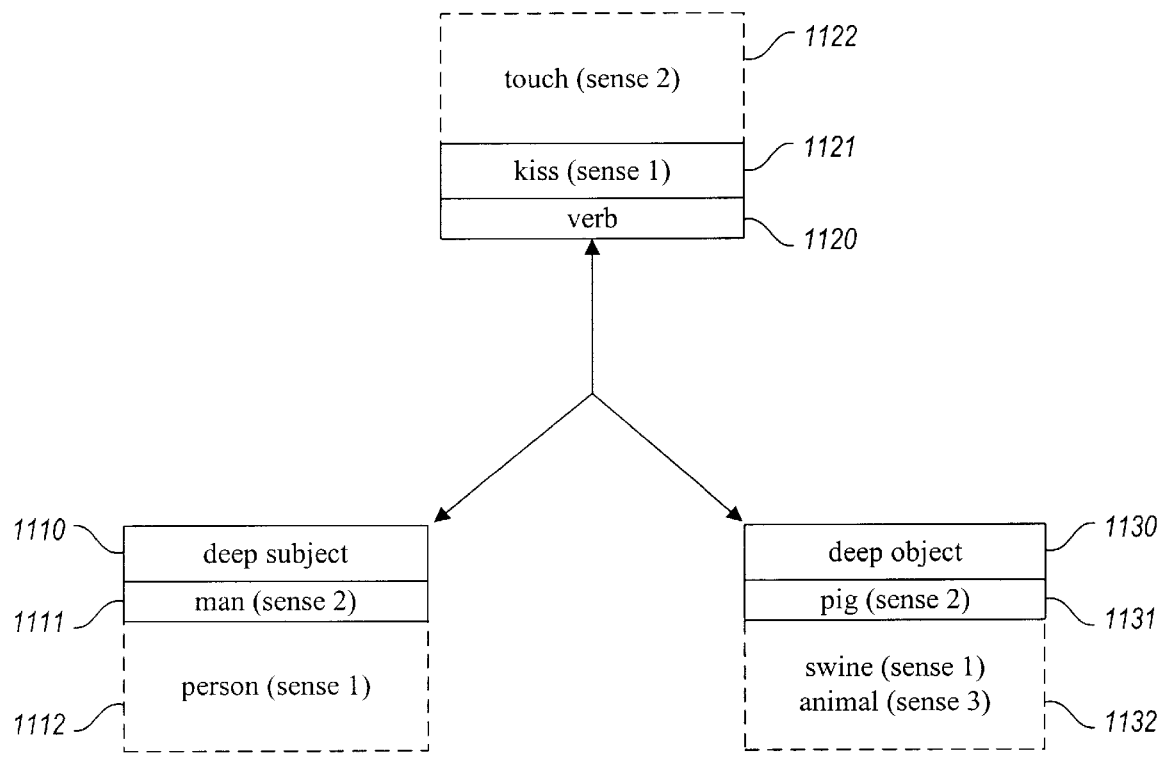
FIG. 11 is a logical form diagram showing the expanded logical form.

FIG. 11 is a logical form diagram showing the expanded logical form. It can be seen from FIG. 11 that the deep subject element 1110 of the expanded logical form contains the hypernym person (sense 1) 1112 in addition to the word man (sense 2) 1111. It can be seen that the verb element 1120 contains the hypernym touch (sense 2) 1122 as well as the word kiss (sense 1) 1121. Further, it can be seen that the deep object element 1130 of the expanded logical form contains the hypernyms swine (sense 1) and animal (sense 3) 1132 in addition to the word pig (sense 2) 1131.

By permuting, in each element of the expanded logical form, the hypernyms with the original words, the facility can create a reasonably large number of derivative logical forms that are reasonably close in meaning to the primary logical form. FIG. 12 is a chart diagram showing the derivative logical forms created by permuting the expanded primary logical form. It can be seen from FIG. 12 that this permutation creates eleven derivative logical forms that each characterize the meaning of the input text in a reasonably accurate way. For example, the derivative logical form (person, touch, pig)

shown in FIG. 12 is very close in meaning to the sentence fragment man kissing a pig The expanded logical form shown in FIG. 11 represents the primary logical form plus these eleven derivative logical forms, which are expressed more compactly as expanded logical form 1200:

((man OR person), (kiss OR touch), (pig OR swine OR animal))

The facility generates logical tokens from this expanded logical form in a manner that allows them to be processed by a conventional information retrieval engine. First, the facility appends a reserved character to each word in the expanded logical form that identifies whether the word occurred in the input text segment as a deep subject, verb, or deep object. This ensures that, when the word "man" occurs in the expanded logical form for a query input text segment as a deep subject, it will not match the word "man" stored in the index as part of an expanded logical form in which it was the verb. A sample mapping of reserved characters to logical form elements is as follows:

| logical form element | identifying character |
| --- | --- |
| deep subject | — |
| verb | ^ |
| deep object | # |

Using this sample mapping of reserved characters, tokens generated for the logical form "(man, kiss, pig)" would include "man_", "kiss^", and "pig#".

Indices generated by conventional information retrieval engines commonly map each token to the particular locations in the target documents at which the token occurs. Conventional information retrieval engines may, for example, represent such target document locations using a document number, identifying the target document containing the occurrence of the token, and a word number, identifying the position of the occurrence of the token in that target document. Such target document locations allow a conventional information retrieval engine to identify words that occur together in a target document in response to a query using a "PHRASE" operator, which requires the words that it joins to be adjacent in the target document. For example, the query "red PHRASE bicycle" would match occurrences of "red" at document 5, word 611 and "bicycle" at document 5, word 612, but would not match occurrences of "red" at document 7, word 762 and "bicycle" at document 7, word 202. Storing target document locations in an index further allows conventional information retrieval engines to identify, in response to a query, the points at which queried tokens occur in the target documents.

For expanded logical forms from a target document input text segment, the facility preferably similarly assigns artificial target document locations to each token, even though the tokens of the expanded logical form do not actually occur in the target document at these locations. Assigning these target document locations both (A) enables conventional search engines to identify combinations of semantic tokens corresponding to a single primary or derivative logical form using the PHRASE operator, and (B) enables the facility to relate the assigned locations to the actual location of the input text fragment in the target document.

The facility therefore assigns locations to semantic tokens as follows:

| logical form element | location |
| --- | --- |
| deep subject | (location of 1st word of input text segment) |
| verb | (location of 1st word of input text segment) + 1 |
| deep object | (location of 1st word of input text segment) + 2 |

The facility therefore would assign target document locations as follows for the tokens of the expanded logical form for "(man, kiss, pig)", derived from a sentence beginning at document 5, word 150: "man_" and "person_"—document 5, word 150; "kiss^" and "touch^"—document 5, word 151; and "pig#", "swine#", and "animal#"—document 5, word 152.

Returning to FIG. 3, in step 303, the facility stores the tokens created by the tokenize routine in the index with locations at which they occur. FIG. 13 is an index diagram showing sample contents of the index. The index maps from each token to the identity of the document and location in the document at which they occur. It should be noted that, while the index is shown as a table to more clearly show the mappings in the index, the index is actually preferably stored in one of a number of other forms that support more efficient location of a token in the index, such as in tree form. Further, the contents of the index are preferably compressed to minimize the size of the index, using such techniques as prefix compression.

It can be seen that, in accordance with step 303, the facility has stored mappings in the index 1300 for each of the words in the expanded logical form. Mappings have been stored in the index from deep subject words "man" and "person" to the target document location at document number 5, word number 150. Word number 150 is the word position at which the input text segment shown in FIG. 6 begins. It can be seen that the facility has appended the reserved character "_" to the tokens corresponding to the deep subject words. By appending this reserved character, the facility is able to retrieve, when later searching the index, instances of these words that occur as the deep subject of a logical form without retrieving occurrence of these words that occur as verbs or deep objects of a logical form. Similarly, the index contains tokens for verb words "kiss" and "touch." The entries for these verb words map them to the target document location at document number 5, word number 151, one word after the target document location of the deep subject words. It can further be seen that the reserved character "^" has been appended to the tokens for these verb words so that this occurrence of these words does not later appear to be an occurrence as a deep subject or deep object element. Likewise, the index contains tokens for the deep object words "animal," "pig," and "swine," mapping them to the target document location at document number 5, word number 152, two words past the target document location at which the phrase begins. The reserved character "#" is appended to the tokens for the deep object words to identify them as deep objects in the index. With the index in the condition shown, the input text fragment shown in FIG. 6 can be found by searching the index for any of the derivative primary logical forms shown in FIG. 12.

In a preferred embodiment in which the facility stores both a mapping of the words literally occurring in the target documents to their actual locations of the target documents and the semantic representation of the target documents in the same index, the word number values for each semantic token of the semantic representation is preferably incremented by a constant larger than the number of words in any document to distinguish semantic tokens of the semantic representation from literal tokens when accessed in the index. To simplify FIG. 13, the addition of this constant is not shown.

In the example, the facility adds a token for each of the words in the expanded logical form to the index to form the semantic representation of the target documents. In one preferred embodiment, however, the facility limits the set of expanded logical form tokens that it adds to the index to those logical form tokens that are likely to be effective at distinguishing between documents among the target documents. To so limit the set of expanded logical form tokens added to the index, the facility preferably determines the Inverse Document Frequency of each token, whose formula is shown by equation (1) below. In this embodiment, the facility adds to the index only tokens whose Inverse Document Frequency exceeds a minimum threshold.

Figure 14:
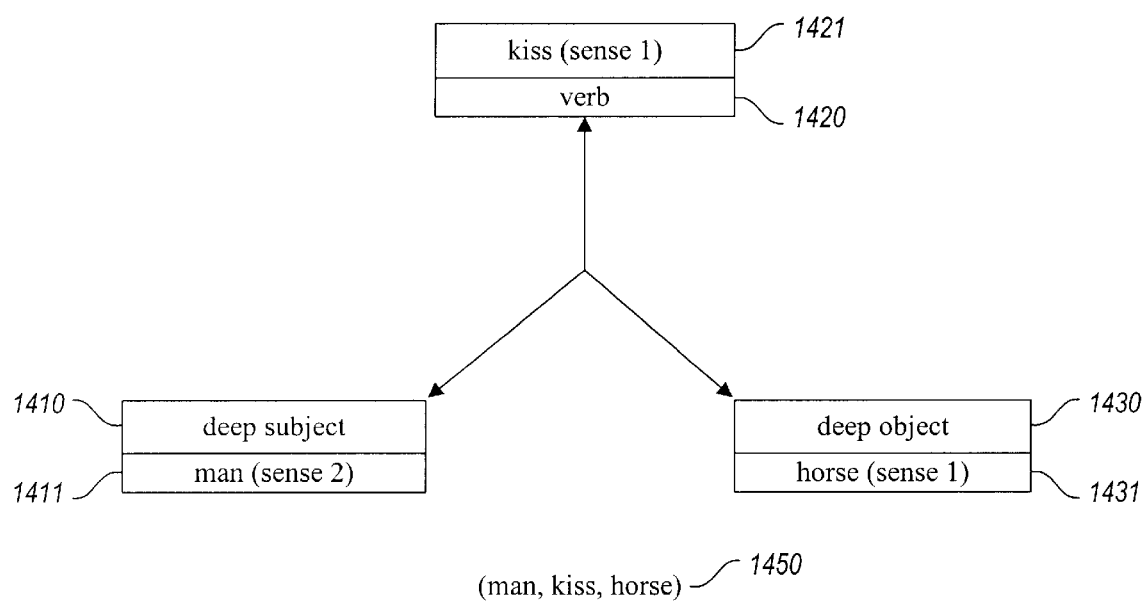
FIG. 14 is a logical form diagram showing the logical form preferably constructed by the facility for the query "man kissing horse."

Returning to FIG. 3, after storing the tokens in the index before the current sentence in the target document, in step 304, the facility loops back to step 301 to process the next sentence in the target documents. When all of the sentences of the target document have been processed, the facility continues at step 305. In step 305, the facility receives the text of a query. In steps 306–308, the facility processes the received query. In step 306, the facility invokes the tokenized routine to tokenize the query text. FIG. 14 is a logical form diagram showing the logical form preferably constructed by the facility for the query "man kissing horse" in accordance with step 401 (FIG. 4). It can be seen from the logical form diagram that the deep subject is man (sense 2), the verb is kiss (sense 1), and the deep object is horse (sense 1). This primary logical form is more succinctly represented as (man, kiss, horse)

in primary logical form 1450.

Figure 15:
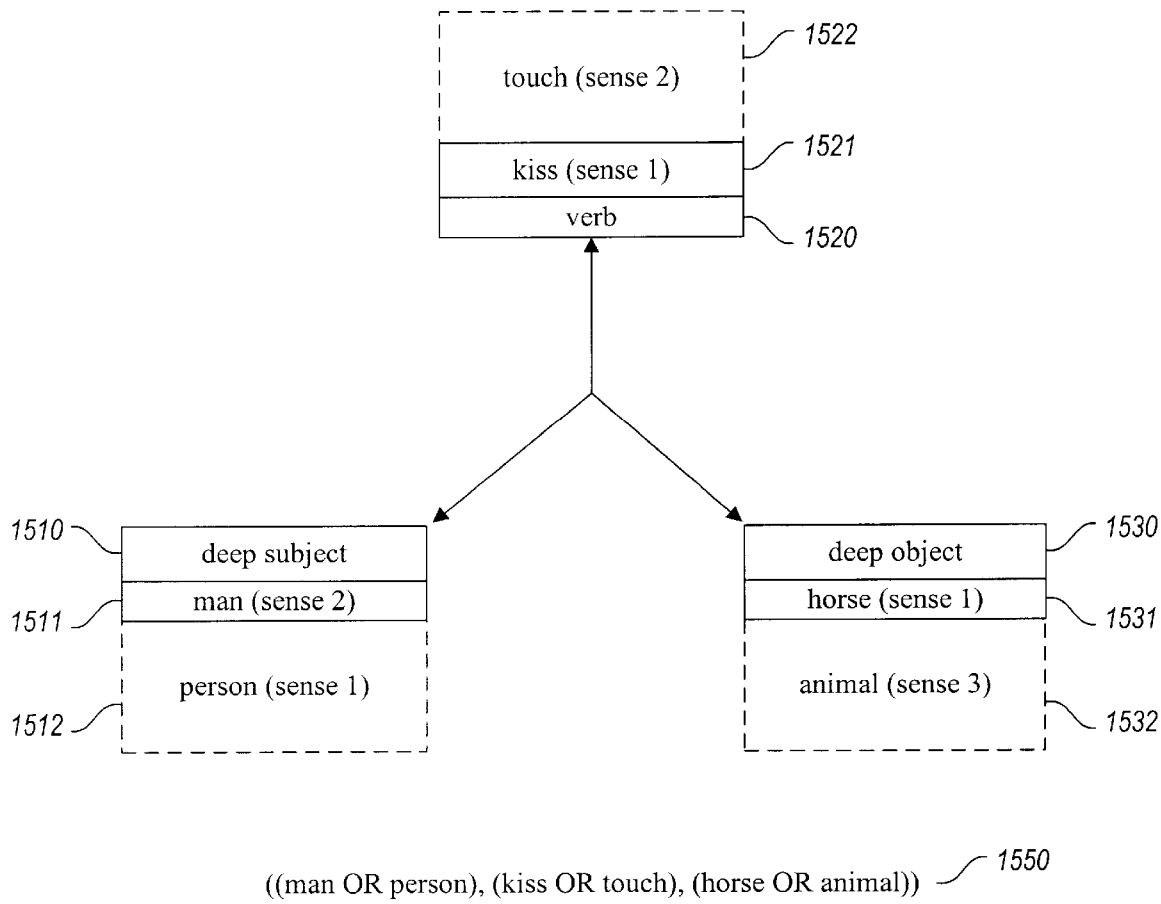
FIG. 15 shows the expansion of the primary logical form using hypernyms.

FIG. 15 shows the expansion of the primary logical form using hypernyms in accordance with steps 402 (FIG. 4). It can be seen from FIG. 15 that, like the sample input text from the target document, the deep subject man (sense 2) has been expanded with the hypernym person (sense 1), and the verb kiss (sense 1) has been expanded with the hypernym touch (sense 2). Further, it can be seen that the deep object horse (sense 1) has been expanded with hypernym animal (sense 3).

Figure 16:
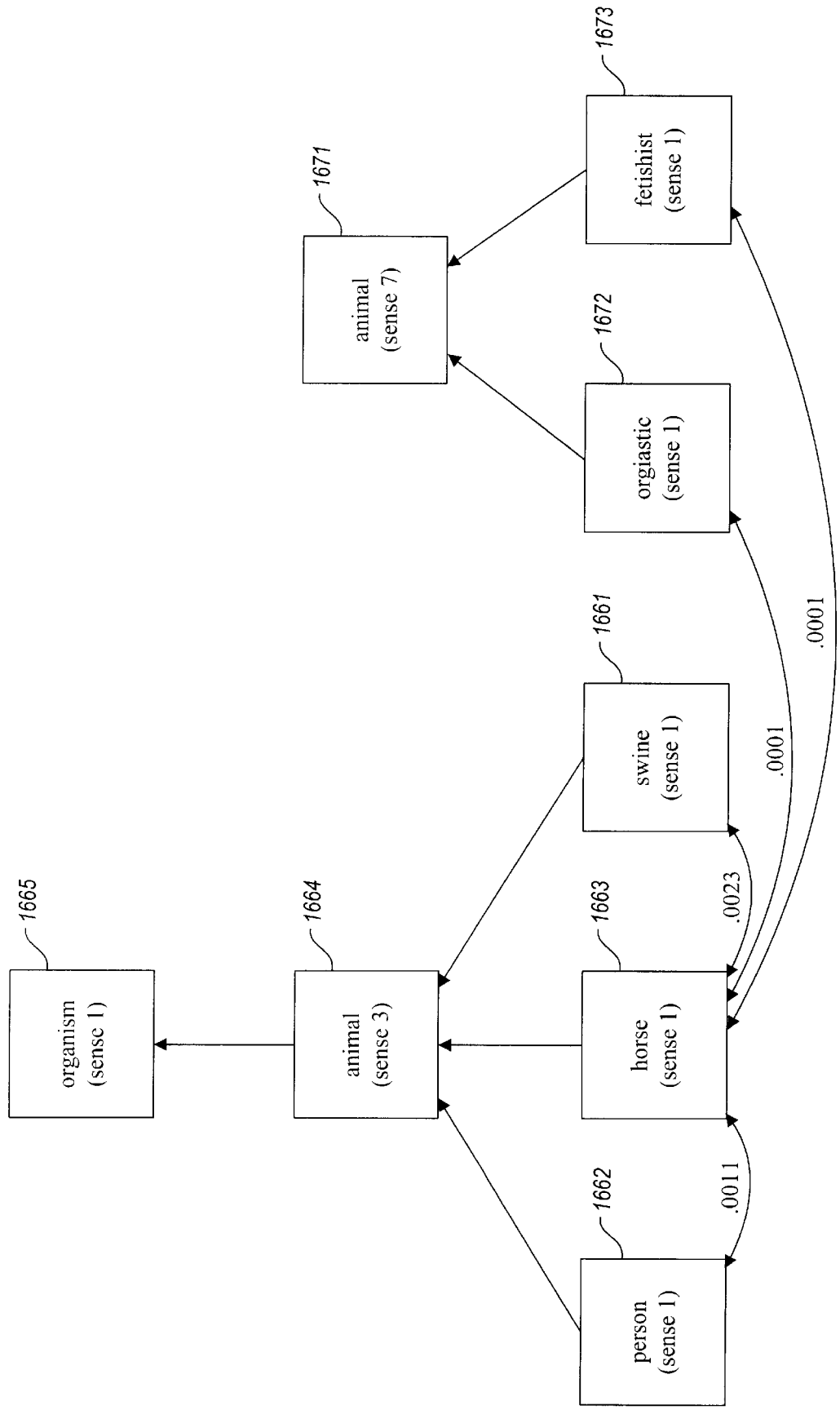
FIG. 16 is a linguistic knowledge base diagram showing the selection of hypernyms of the deep object of the query logical form, horse (sense 1).

FIG. 16 is a linguistic knowledge base diagram showing the selection of hypernyms of the deep object of the query logical form, horse (sense 1). It can be seen from FIG. 16 that the facility does not select the hypernym organism (sense 1) of animal (sense 3), since fewer than 90% of the hyponyms of animal (sense 3) have similarity weights at or above the "0.0015" threshold similarity weight. The facility therefore uses only the hypernym animal (sense 3) to expand the logical form.

Returning to FIG. 3, in step 307, the facility uses the expanded logical form 1550 (FIG. 15) constructed using hypernyms of the word senses in the primary logical form to retrieve from the index locations in the target documents at which matching tokens occur. The facility preferably does so by issuing the following query against the index:

(man__OR person__ PHRASE (kiss^ OR touch^) PHRASE (horse™ OR animal#)

The PHRASE operator matches occurrences of the operand following it at a word position 1 greater than the operand preceding it. Therefore, the query matches where the deep subject man__ or person__ precedes the verb kiss^ or touch^, which precedes the deep object horse# or animal#. It can be seen from the index in FIG. 13 that this query is satisfied at document number 5, word number 150.

If this query was not satisfied in the index, the facility would continue to submit the query in two different partial queries. The first partial form contains only the deep subject and the verb, and not the object:

(man__ OR person__) PHRASE (kiss^ OR touch^)

Figure 17:
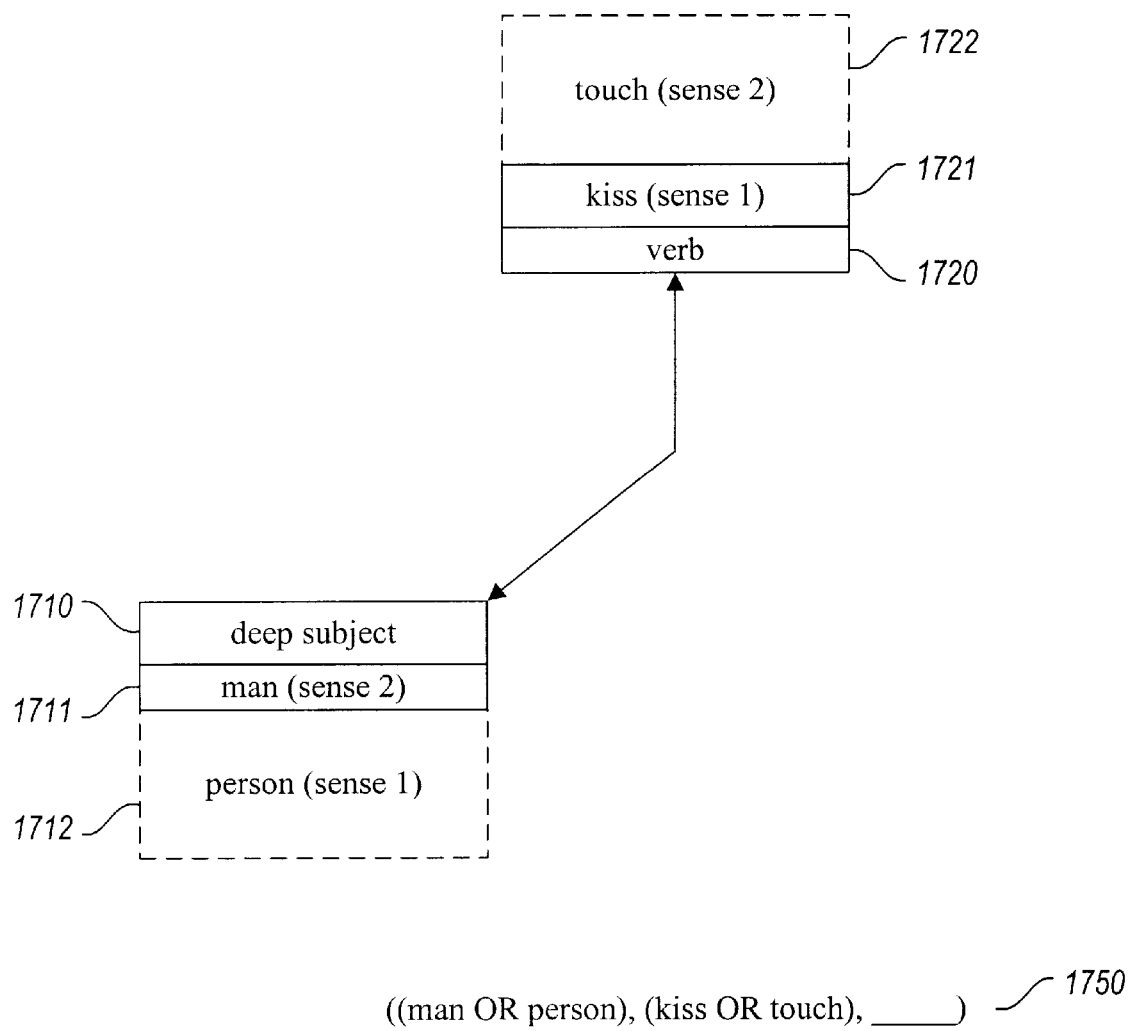
FIG. 17 is a partial logical form diagram showing a partial logical form corresponding to a partial query containing only a deep subject and a verb.

FIG. 17 is a partial logical form diagram showing the partial logical form corresponding to this first query. The second partial form of the query contains the verb and deep object, but not the deep subject:

(kiss^ OR touch^) PHRASE (horse# OR animal#)

Figure 18:
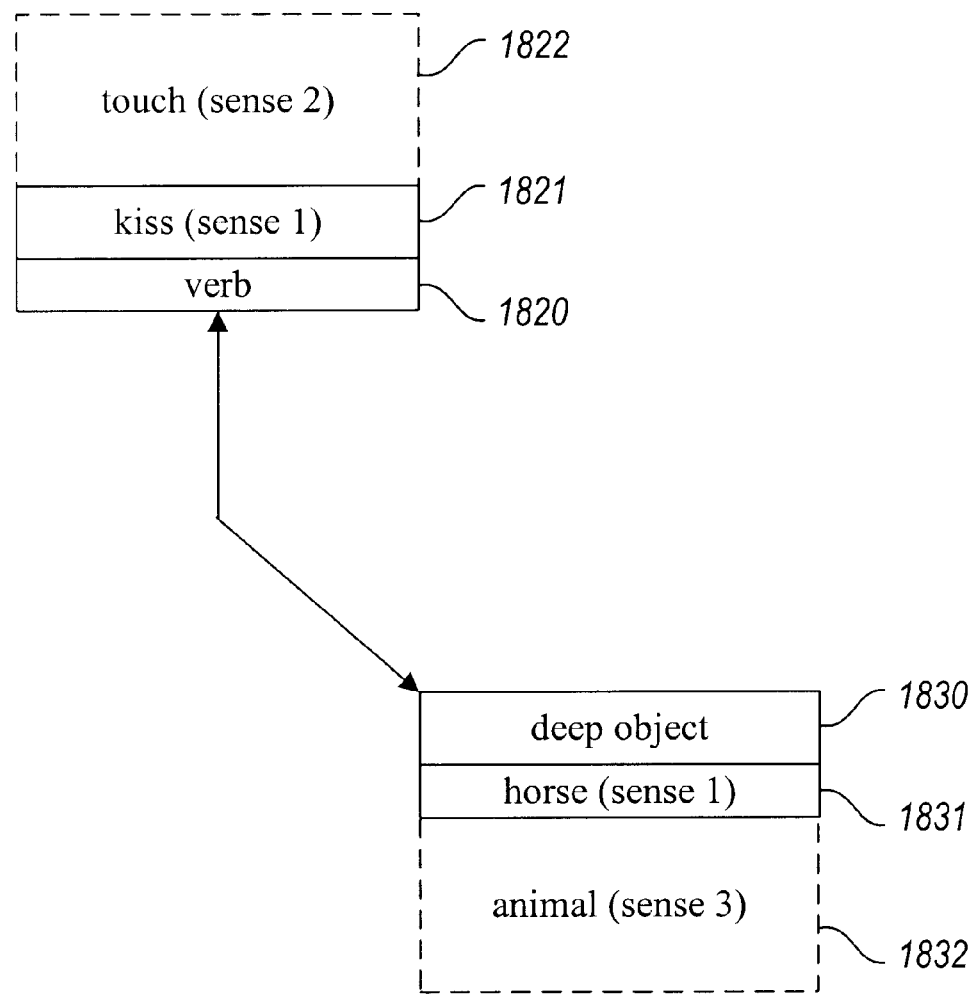
FIG. 18 is a partial logical form diagram showing a partial logical form corresponding to a partial query containing only a verb and a deep object.

FIG. 18 is a partial logical form diagram showing the partial logical form corresponding to this second partial query. These partial queries would match logical forms in the index having a different deep subject or deep object, and would match partial logical forms not having a deep subject or deep object. These partial queries take into consideration differences between the query input text segment and target document input text segments including pronoun usage and implied deep subjects and deep objects.

Returning to FIG. 3, after identifying matches of tokens in the index, the facility continues in step 308 to rank the target documents in which matches of particular combinations of matching tokens, corresponding to a primary or derivative logical form, occur in the order of their relevance to the query. In various embodiments of the invention, the facility employs one or more of a number of well-known approaches to ranking documents by relevancy, which include Jaccard weighting and binary term independence weighting. The facility preferably uses a combination of inverse document frequency and term frequency waiting to rank the matching target documents.

The inverse document frequency weight characterizes a token combination's ability to distinguish between documents, giving greater weight to a token combination appearing in fewer of the target documents. For example, for a group of target documents directed to the subject of photography, the logical form (photographer, frame, subject)

could occur in each document of the group, and thus would not be a very good basis for distinguishing between documents. Because the above logical form occurs in every target document, it has a relatively small inverse document frequency. The formula for inverse document frequency of a token combination is as follows:

$$\text{Inverse Document Frequency (token combination)} = \log\left(\frac{\text{total number of target documents}}{\text{number of target documents containing token combination}}\right) \quad (1)$$

The term frequency weight of a token combination in a document measures the extent to which the document is dedicated to the token combination, and assumes that a document in which a particular query token occurs a large number of times is more relevant than a document in which the query token occurs fewer times. The formula for the term frequency weight of a token combination in document is as follows:

Term Frequency (token combination, document)=number of times token combination occurs in document  (2)

The facility uses a score for each matching document to rank the documents. The facility first calculates a score for each matching token combination in each document, using the following formula:

Score (token combination, document)=Inverse Document Frequency (token combination)×Term Frequency (token combination, document)  (3)

The facility then calculates the score for each matching document by choosing the highest score for any matching token combination in each matching document in accordance with the following formula:

$$\text{Score (document)} = \max\left(\bigvee_{\substack{\text{token combination} \\ \text{in document}}} (\text{Score (token combination, document)})\right) \quad (4)$$

Once the facility has calculated a score for each document, the facility may augment these scores to reflect terms of the query other than those directed to semantic matching. After augmenting the score for each document, if necessary, the facility calculates a normalized score for each document by taking the size of the document into account as shown in the following formula:

$$\text{Normalized Score (document)} = \frac{\text{Score (document)}}{\text{Size (document)}} \quad (5)$$

The Size (document) term may be any reasonable measure of the size of a document—for example, the number of characters, words, or sentences or sentence fragments in the document. The document score may alternatively be normalized using a number of other normalization techniques, including cosine measure normalization, sum of term weights normalization, and maximum term weights normalization.

After calculating normalized scores for each matching document, the facility ranks the matching documents in order of the normalized scores for the documents. A user may preferably select one of the matching documents from the ranked list to obtain a location of the matching tokens in that document, or to display the matching portion of that document.

Returning to FIG. 3, after ranking the matching target documents in step 308, the facility preferably continues at step 305 to receive the text of the next query against the index.

The above discusses ranking by relevancy the documents containing matching tokens. Additional preferred embodiments of the invention similarly rank by relevancy document groups and document sections, respectively, that contain matches. For target documents that are organized into document groups each containing one or more documents, the facility preferably ranks the document groups in which matches occur by relevancy in order to identify the most relevant document groups for further querying. Further, the facility is preferably configurable to divide each target document into sections and rank the relevancy of document sections in which matches occur. These document sections may be identified contiguously within a target document either by selecting a certain number of bytes, words, or sentences, or by using structural, formatting, or linguistic cues occurring in the target document. The facility may also preferably identify non-contiguous document sections dealing with particular themes.

While the present invention has been shown and described with reference to preferred embodiments, it will be understood by those skilled in the art that various changes or modifications in form and detail may be made without departing from the scope of the invention. For example, the tokenizer may be straightforwardly adapted to produce and store in the index tokens each corresponding to a complete logical form construction instead of tokens each corresponding to one word of a logical form construction. Also, various well-known techniques may be applied to incorporate other types of searching in a query having a semantic matching component. Further, a query may contain a number of semantic matching components. In addition, semantic relationships identified between words other than hypernyms may be used to expand the primary logical form. The facility may also use precompiled lists of substitutable words for each word in a primary logical form to expand the primary logical form, rather than generating lists of hypernyms from a lexical knowledge base at runtime as described above. Further, for additional matching precision, the tokenizer may encode in the token for a word the sense number identified for the word. In this case, the test for coherency of the hyponym set is reduced from testing similarity with all senses of the selected hypernym. In the example, only the hyponyms of sense 1 of the word person need to bear a threshold level of similarity with the starting sense of the word man (sense 2). Because the possible matching terms in the index are less ambiguous we can constrain the set of terms which might produce false hits. For this reason it is only necessary to test for the senses which have a hypernym relation to the word in the logical form.

What is claimed is:

1. A method in a computer system for generating information retrieval tokens from an input string, the method comprising the steps of:

creating from the input string a primary logical form characterizing a semantic relationship between selected words in the input string;

identifying hypernyms of the selected words in the input string, at least one hypernym being identified from a group of hypernyms associated with a selected word wherein at least one other hypernym in the group is not identified;

constructing from the primary logical form one or more alternative logical forms, each alternative logical form being constructed by, for each of one or more of the selected words in the input string, replacing the selected word in the primary logical form with an identified hypernym of the selected word; and generating tokens representing both the primary logical form and the alternative logical forms, the generated tokens being distinguishable by an information retrieval engine.

2. The method of claim 1 wherein the constructing step includes the step of parsing the input string to discern its syntactic and semantic structure.

3. The method of claim 2 wherein the identifying step includes the steps of:

for each selected word of the input text:
      retrieving from a linguistic knowledge base one or more hypernyms of the selected word each having a similarity value characterizing the similarity in meaning of the hypernym to the selected word; and
      identifying any of the hypernyms whose similarity value exceeds a preestablished threshold.

4. The method of claim 1, further comprising the steps of:

before the constructing step, selecting the input string from a search query; and submitting the generated tokens to a query engine for comparison to a representation of one or more target documents.

5. The method of claim 1, further comprising the steps of:

before the constructing step, selecting the input string from a body of text to be indexed; and submitting the generated tokens to an indexing subsystem for storage in an index representing the body of text.

6. The method of claim 5, further including the step of determining an inverse document frequency of each of the words occurring in the alternative logical forms, and wherein the submitting step omits to submit to the indexing subsystem tokens representing alternative logical forms containing words whose inverse document frequency is smaller than a preestablished minimum inverse document frequency.

7. The method of claim 5, further including the steps of:

after the submitting step, determining an inverse document frequency of each of the words occurring in the alternative logical forms; and removing from the index tokens representing alternative logical forms containing words whose inverse document frequency is smaller than a preestablished minimum inverse document frequency.

8. The method of claim 1 wherein the identifying step identifies hypernyms of the selected words that have coherent hyponym sets with respect to the selected words.

9. A computer-readable medium whose contents cause a computer system to generate information retrieval tokens from an input string by performing the steps of:

creating from the input string a primary logical form characterizing a semantic relationship between selected words in the input string;

identifying hypernyms of the selected words in the input string, at least one hypernym being identified from a group of hypernyms associated with a selected word wherein at least one other hypernym in the group is not identified;

constructing from the primary logical form one or more alternative logical forms, each alternative logical form being constructed by, for each of one or more of the selected words in the input string, replacing the selected word in the primary logical form with an identified hypernym of the selected word; and generating tokens representing both the primary logical form and the alternative logical forms, the generated tokens being distinguishable by an information retrieval engine.

10. The computer-readable medium of claim 9 wherein the constructing step includes the step of parsing the input string to discern its syntactic and semantic structure.

11. The computer-readable medium of claim 9 wherein the identifying step includes the steps of:

for each selected word of the input text:

retrieving from a linguistic knowledge base one or more hypernyms of the selected word each having a similarity value characterizing the similarity in meaning of the hypernym to the selected word; and identifying any of the hypernyms whose similarity value exceeds a preestablished threshold.

12. The computer-readable medium of claim 9 wherein the contents of the computer-readable medium further cause the computer system to perform the steps of:

before the constructing step, selecting the input string from a search query; and submitting the generated tokens to a query engine for comparison to a representation of one or more target documents.

13. The computer-readable medium of claim 9 wherein the contents of the computer-readable medium further cause the computer system to perform the steps of:

before the constructing step, selecting the input string from a body of text to be indexed; and submitting the generated tokens to an indexing subsystem for storage in an index representing the body of text.

14. The computer-readable medium of claim 13 wherein the contents of the computer-readable medium further cause the computer system to perform the step of determining an inverse document frequency of each of the words occurring in the alternative logical forms, and wherein the submitting step omits to submit to the indexing subsystem tokens representing alternative logical forms containing words whose inverse document frequency is smaller than a preestablished minimum inverse document frequency.

15. The computer-readable medium of claim 13, further including the steps of:

after the submitting step, determining an inverse document frequency of each of the words occurring in the alternative logical forms; and removing from the index tokens representing alternative logical forms containing words whose inverse document frequency is smaller than a preestablished minimum inverse document frequency.

16. The computer-readable medium of claim 9 wherein the identifying step identifies hypernyms of the selected words that have coherent hyponym sets with respect to the selected words.

17. A method in a computer system for creating and accessing an information retrieval index, the index characterizing one or more indexed documents by storing tokenized semantic structures occurring in the indexed documents, the method comprising the steps of:

for each of a plurality of passages in the indexed documents;

receiving a plurality of tokenized semantic structures all corresponding to the same passage, receiving an indexed document location for the passage, and storing in the index mappings from each of the plurality of received tokenized semantic structures to the index document location; and for a query issued against the indexed documents:

receiving a tokenized semantic structure corresponding to the query, identifying in the index a mapping from a tokenized semantic structure matching the tokenized semantic structure corresponding to the query to an identified indexed document location, and returning the identified indexed document location.

18. The method of claim 17 wherein the step of receiving a tokenized semantic structure corresponding to the query includes the step of receiving a plurality of tokenized semantic structures all corresponding to the same query, and wherein the identifying step identifies a mapping from a tokenized semantic structure matching any of the plurality of tokenized semantic structures corresponding to the query.

* * * * *

UNITED STATES PATENT AND TRADEMARK OFFICE
CERTIFICATE OF CORRECTION

PATENT NO. : 6,161,084
DATED : December 12, 2000
INVENTOR(S) : Messerly et al.

It is certified that error appears in the above-identified patent and that said Letters Patent is hereby corrected as shown below:

Column 9,
Line 30, insert -- ^ -- under "Identifying Character" column across from "verb".

Column 11,
Line 64, insert -- ) -- after "person_".
Line 65, change "horseTM" to -- horse# --.

Column 14,
Line 59, change "2" to -- 1 --.

Signed and Sealed this

Thirtieth Day of October, 2001

Attest:

*Nicholas P. Godici*

NICHOLAS P. GODICI
*Attesting Officer*  *Acting Director of the United States Patent and Trademark Office*